June 4, 1968  R. J. PURTELL  3,386,464
TRAIL TUBE MOVERS
Filed Jan. 26, 1966  2 Sheets-Sheet 1
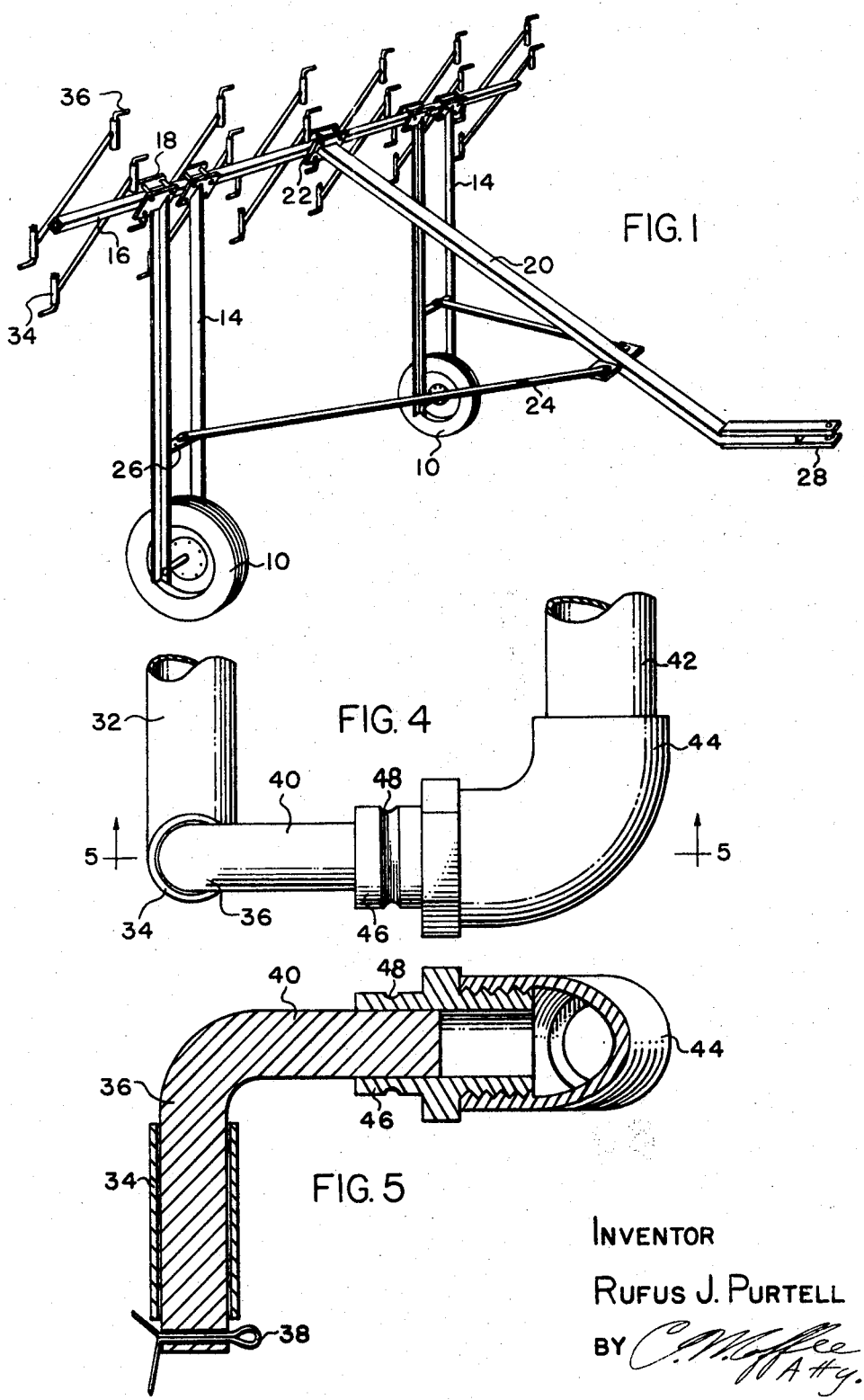
INVENTOR
Rufus J. Purtell
BY

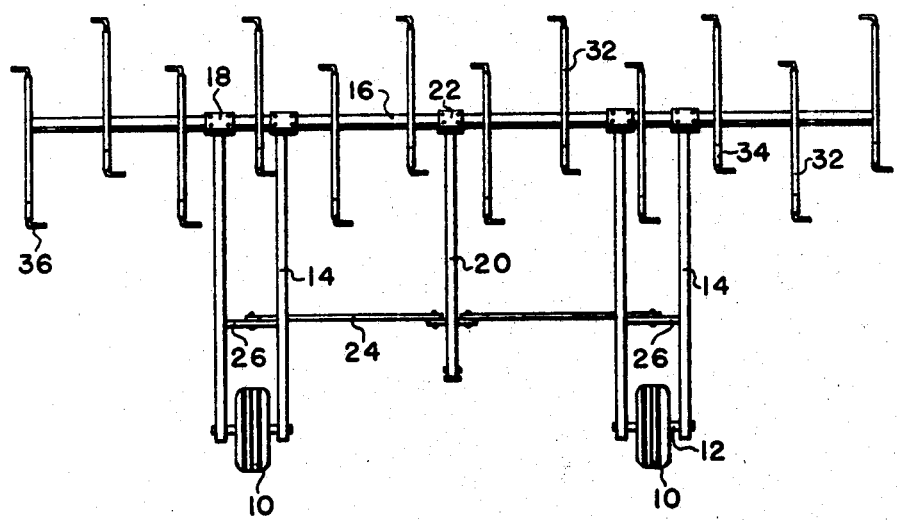
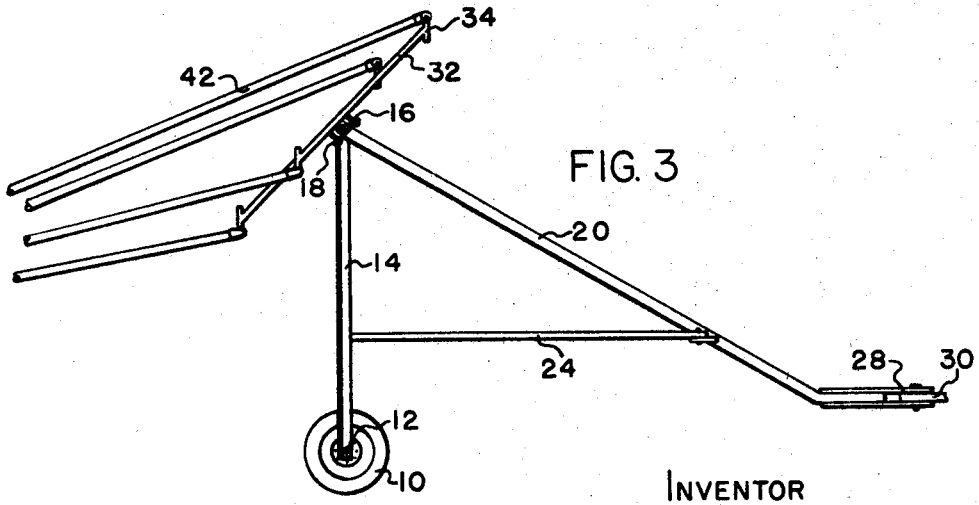

United States Patent Office 3,386,464
Patented June 4, 1968

3,386,464
TRAIL TUBE MOVERS
Rufus J. Purtell, Brownfield, Tex., assignor, by mesne assignments, to Tri-Matic, Inc., a corporation of Texas
Filed Jan. 26, 1966, Ser. No. 523,125
6 Claims. (Cl. 137—344)

This invention relates to agricultural irrigation and more particularly to moving portions of equipment such as are shown in my prior patents, No. 3,157,193 issued Nov. 17, 1964, and No. 3,230,969 issued Jan. 25, 1966.

As noted in these patents, it is advantageous to use trail tubes when irrigating land, these trail tubes trailing behind the main irrigation pipe which is moved. When the entire system is to be moved from one field to another or when the entire system is to be stored during a non-irrigating season (such as harvest), a certain amount of hand labor and effort is required in moving the trail tubes.

I have designed a simple, trailer-like mechanism to which the trail tubes may be quickly and easily attached so that they may be easily removed from the system and moved where desired.

An object of this invention is to move long tubes having a bored fitting on one end.

Another object is to move the trail tubes of an agricultural irrigation system.

Further objects are to achieve the above with a device that is sturdy, compact, durable, simple, and reliable, yet inexpensive and easy to manufacture and operate.

Still further objects are to achieve the above with a method that is rapid and inexpensive and does not require skilled people to adjust and operate.

The specific nature of the invention, as well as other objects, uses, and advantages thereof, will clearly appear from the following description and from the accompanying drawing, the different views of which are not necessarily to the same scale, in which:

FIG. 1 is a perspective view of a structure according to one embodiment of this invention.

FIG. 2 is a rear elevational view of the structure of FIG. 1.

FIG. 3 is a side elevational view of the structure with the trail tubes shown attached and with the hitch shown attached to a towing vehicle.

FIG. 4 is a top elevational detail of one of the connections to the trail tube.

FIG. 5 is a sectional view taken substantially on line 5—5 of FIG. 4.

Referring more particularly to the drawings, the embodiment of the invention is a mover having two ground engaging wheels 10, each mounted upon spindle 12. Each spindle is attached between two shanks 14 which depend from main crossbar 16. The shanks are attached to the crossbar by clamps 18 so that the distance between the wheels 10 may be adjusted to correspond to the row width where the mover is to be used. The crossbar 16 is elevated a considerable height above the ground so as to be higher than growing crops if it is desired to be used in such location.

Tongue 20 extends forward and downward from the center of crossbar 16 and is attached thereto by clamp 22. Braces 24 are pivotally attached to the forward portion of the tongue 20 and to cross member 26 adjacent to the lower end of the shanks 14. The forward end of the tongue 20 has a pair of plates 28 forming a hitch. By putting a pin through a hole in the plates, the mover is readily attached to a towing vehicle shown only by its hitch 30 in FIG. 3. The tongue and hitch form means for moving the crossbar transversely.

A plurality (specifically twelve) of arms 32 are attached at an angle to the crossbar 16. The arms 32 are spread across the crossbar 16 (which is a part of the frame). By angular, it is meant that, when viewed from a side view (FIG. 3), the arms 32 will angle from a low point at the rear to a high point forward. This angle is about 45° to horizontal. Otherwise, the arms 32 are at right angles to the crossbar 16, meaning that they are generally aligned in the direction of travel inasmuch as the crossbar 16, which is parallel to the spindles 12, is horizontal and transverse to the direction of travel. The arms 32 are staggered longitudinally to the direction of travel, i.e., referring more particularly to FIG. 2, one of them is attached so that its ends are low while the adjacent ones are attached so that their ends are high. Preferably, the arms are made of tubular metal and attached by any convenient means, such as welding, to the square crossbar 16. A cylindrical sleeve 34 is attached at each end of each of the arms 32. Each sleeve 34 is attached with its axis vertical to the arms by welding.

Bent pin 36 is carried in each of the sleeves. The pin 36 is telescoped within the sleeve 34 and is prevented from sliding upward in the sleeve by cotter key 38 through a hole at the end of the pin. The pin does not slide downward in the sleeve 34 because it is bent so that it has a horizontal leg 40 which is at right angles to the vertical leg which is telescoped within the sleeve. The pin 36 is free to rotate about its vertical axis within the sleeve 34.

Trail tubes 42 to be moved are quite long (for example, 60 or 90 feet) and they have two or three sprinklers (not shown) upon each. They are made from one inch aluminum tubing which is flexible and light. Each of the trail tubes 42 has a connector or fitting 46 on one end by which it is connected to the main irrigation pipe. The fitting 46 is the male portion of a quick-snap connector having groove 48 for that purpose and attached by elbow 44 to the tube 42. Therefore, the male portion has a bore therethrough which is slightly larger than the diameter of the pin 36. The axis of the bore through the male portion is normal to the axis of the trail tube 42.

In operation, the trail tubes are all disconnected from the main irrigation pipe and laid on the ground. Then the main irrigation pipe is moved forward approximately 10 feet so that it is clear at the ends of the trail tubes. Next the towing vehicle is attached to the trail tube mover and the trail tube mover, beginning at one end of the main pipe, is moved parallel to the main irrigation pipe. Each of the individual trail tubes are picked up and the male portion 46 is telescoped over the horizontal leg 40 of the pin 36. As the trail tube mover is moved forward, the trail tube is securely held to the pin 36 by friction. Inasmuch as the pin is free to rotate, the drag of the trail tube upon the pin 36 tends to rotate it slightly and, when it is rotated slightly, the pin binds within the bore of the male portion, thus securely holding the male portion to the pin. However, to release the trail tube from the pin, all that is necessary is to pull it from the pin. In such a situation, the dragging force can readily be be relieved. There is no problem in either attaching the trail tube to the pin or releasing it therefrom.

As described, each of the trail tubes is individually attached to the pin and then the entire mover is moved to the desired location. When the system is ready for re-activation, the procedure is reversed.

As stated before, the arms 32 are staggered upon the crossbar 16. Therefore, looking at FIG. 3, it may be seen that each of the trail tubes are rather evenly spaced so that they are in one of four positions. Therefore, the trail tubes themselves are rather widely spaced so that the sprinklers upon the trail tubes do not tend to become entangled.

It will be apparent that the embodiment shown is only exemplary and that various modifications can be made in construction, materials, and arrangement within the scope of the invention as defined in the appended claims.

I claim as my invention:

1. A mover for towing irrigation trail tubes comprising:
   (a) a frame,
   (b) at least two ground engaging wheels attached to the frame,
   (c) means attached to the frame for moving the frame along the ground in a certain direction of travel,
   (d) a plurality of connection point means attached to the frame for connecting a trail tube to each connection point means,
   (e) said connection point means spread across the frame transversely of the direction of travel,
   (f) said connection point means staggered along the frame longitudinally of the direction of travel, and
   (g) said connection point means higher at the front than rear.

2. The invention as defined in claim 1 wherein each connection point means includes:
   (h) a bent pin,
   (j) one leg of said pin journaled to the frame for pivoting about an axis angled to the direction of travel,
   (k) a second leg of said pin extending also angled to the direction of travel,
   (m) said second leg adapted by size to telescope within a fitting of the trail tube which extends normal to the axis of the trail tube.

3. In a system for moving
   (a) a plurality of long tubes,
   (b) each tube having a fitting on one end with a cylindrical bore therein normal to the long tube,
   (c) the improved means for connecting each long tube to a mover comprising in combination:
   (d) a pin journaled to the mover about an axis angled to the long tube,
   (e) a leg of said pin telescoped within said bore,
   (f) said leg at an angle to the axis about which the pin is journaled.

4. The invention as defined in claim 3 with the addition of:
   (g) a long crossbar,
   (h) a plurality of arms attached to said crossbar,
   (j) one of said means for connecting attached at each end of each crossbar, and
   (k) means attached to said crossbar for moving the crossbar.

5. The invention as defined in claim 4 wherein said means for moving includes:
   (m) two ground engaging wheels clamped to said crossbar, and
   (n) a tongue clamped to said crossbar so that the crossbar may be towed along the ground.

6. The method of moving irrigation trail tubes, each having a bored fitting on one end normal to the tube, comprising:
   (a) disconnecting the fittings of the trail tubes from the main pipe,
   (b) telescoping the bored fitting of each trail tube over a pin,
   (c) moving the pins in a certain direction so that the trail tubes drag behind, and
   (d) permitting the pins to rotate about an axis angled to the direction of travel and at an angle to the bore.

References Cited

UNITED STATES PATENTS

| | | | |
|---|---|---|---|
| 2,174,600 | 10/1939 | Schutmaat | 137—344 XR |
| 3,090,566 | 5/1963 | Snyder et al. | 239—212 XR |
| 3,143,298 | 8/1964 | Jones | 239—212 XR |
| 3,195,563 | 7/1965 | Race | 137—344 XR |

SAMUEL SCOTT, *Primary Examiner.*